United States Patent [19]

Kosugi et al.

[11] Patent Number: 4,796,924
[45] Date of Patent: Jan. 10, 1989

[54] COUPLING FOR MULTI-PASSAGE TUBE

[75] Inventors: Seiji Kosugi; Norio Ando; Hisao Sagara, all of Sohka, Japan

[73] Assignee: Shoketsu Kinzoku Kogyo Kabushiki Kaisha, Tokyo, Japan

[21] Appl. No.: 153,569

[22] Filed: Feb. 2, 1988

Related U.S. Application Data

[63] Continuation of Ser. No. 824,235, Jan. 30, 1986, abandoned.

[30] Foreign Application Priority Data

Aug. 20, 1985 [JP] Japan .............................. 60-127106[U]
Aug. 26, 1985 [JP] Japan .............................. 60-130687[U]

[51] Int. Cl.⁴ .............................................. F16L 39/00
[52] U.S. Cl. ................................... 285/39; 285/133.1; 285/323
[58] Field of Search .................. 285/39, 133.1, 131, 285/323

[56] References Cited

U.S. PATENT DOCUMENTS

| | | | |
|---|---|---|---|
| 236,519 | 1/1881 | Walsh | 285/133.1 X |
| 1,119,916 | 12/1914 | Willis | 285/133.1 X |
| 1,481,255 | 1/1924 | Cumfer | 285/133.1 X |
| 2,203,210 | 6/1940 | Young | 285/133.1 X |
| 2,838,074 | 6/1958 | Lauck | 285/133.1 |
| 2,983,506 | 5/1961 | Bertsch et al. | 285/133.1 X |
| 3,967,838 | 7/1976 | Legris | 285/323 X |
| 4,021,062 | 5/1977 | Mariaulle | 285/39 |
| 4,323,269 | 4/1982 | Pellenc | 285/133.1 |
| 4,508,369 | 4/1985 | Mode | 285/323 X |

FOREIGN PATENT DOCUMENTS

| | | | |
|---|---|---|---|
| 659362 | 3/1963 | Canada | 285/133.1 |
| 1947230 | 4/1971 | Fed. Rep. of Germany | 285/133.1 |
| 1065308 | 5/1954 | France | 285/133.1 |

Primary Examiner—Thomas F. Callaghan
Attorney, Agent, or Firm—Burns, Doane, Swecker & Mathis

[57] ABSTRACT

A multi-passage tube coupling for coupling a plurality of parallel or concentric tubes or tube passages of a multi-passage tube for supplying a fluid to actuators. The coupling comprises a body and a coupling member, the body having as many passages or holes as the number of the tubes or tube passages of the multi-passage tube. At least one of the tubes or tube passages is coupled to the corresponding actuator through a passage defined in the coupling member.

3 Claims, 16 Drawing Sheets

COUPLING FOR MULTI-PASSAGE TUBE

This application is a continuation of application Ser. No. 824,235, filed Jan. 30, 1986, and now abandoned.

BACKGROUND OF THE INVENTION

The present invention relates to a coupling for a multi-passage tube, and more particularly to a coupling capable of easily connecting a multi-passage tube having a plurality of fluid passages for introducing and discharging a fluid to a pneumatic device such as a solenoid-operated valve, a cylinder, or the like.

Fluid-pressure-operated devices are heretofore in widespread use for utilizing a fluid such as air to drive and control objects. Such fluid-pressure-operated devices normally have a plurality of ports for introducing and discharging the fluid, and tubes are connected to these ports. These tubes for introducing and discharging the fluid are designed in as compact an arrangement as possible for reducing the space for installation thereof to facilitate their maintenance and servicing. One example of such a tubing arrangement is illustrated in FIG. 1 of the accompanying drawings.

A device 2 such as the manifold of a solenoid-operated valve has first and second ports 4, 6 to which tubes 8,10 are connected respectively. A first tube coupling 12 is interposed between the tube 8 and the first port 4, and a second tube coupling 14 is interposed between the tube 10 and the second port 6. Actually, the first and second couplings 12, 14 have ends threaded respectively in the first and second ports 4, 6, and the tubes 8, 10 are fitted respectively over engagement tubes 16, 18 integral with the first and second tube couplings 12, 14, respectively.

The tubes 8, 10 are put together by a string 20, a band or the like to reduce their installation space and make their maintenance and servicing easy. With the illustrated conventional arrangement, however, the number of tubes such as the tubes 8, 10 is increased if the fluid-pressure-operated device has many ports as with a manifold-type solenoid-operated valve. As the number of tubes used is larger, the tubing system required becomes more complex, and the space taken up by the tubing system also becomes greater. Furthermore, since the tubes required to be held together by the string 20, a band or the like at several locations therealong, a certain number of fastening steps are required to bundle the tubes together. The more the tubes are employed, the more steps are required to arrange the tubes, with the result that the danger of connecting some tubes to wrong ports will be increased. In addition, when a plurality of tubes are tied by a string, a band or the like, the pitches or distances between the tubes are reduced. Due to the reduced pitches, it would be difficult for the operator to insert the tubes into the respective tube couplings for connection to the device. The increased number of tube couplings used also tends to result in an increase in the number of steps of arranging the tubes in place.

SUMMARY OF THE INVENTION

In view of the aforesaid problems of the conventional tubing arrangement, it is an object of the present invention to provide a coupling for a multi-passage tube, which has a body defining therein as many as fluid passages as the number of fluid passages in the multi-passage tube, so that the multi-passage tube can be coupled to the coupling body with the fluid passages in the body being held in communication with the respective fluid passages in the multi-passage tube for supplying a fluid from the fluid passages in the multi-passage tube via the fluid passages in the coupling body into a device such as a fluid cylinder, a solenoid-operated valve manifold, or the like, whereby the space required for installing the multi-passage tube can be reduced, the number of steps of arranging the multi-passage tube can be reduced, and the multi-passage tube can easily and reliably be connected to the device.

Another object of the present invention is to provide a coupling for a multi-passage tube having a plurality of fluid passages, comprising a coupling member for engaging the multi-passage tube, and a body having as many fluid passages as the number of the fluid passages of the multi-passage tube, said coupling member having a passage defined at least therein for providing communication between one of the fluid passages of the multi-passage tube and one of the fluid passages of said body.

Still another object of the present invention is to provide a coupling for a multi-passage tube having a plurality of fluid passages, comprising a body having an insertion hole for insertion of the multi-passage tube therein and as many fluid passages communicating with said insertion hole as the number of the fluid passages of the multi-passage tube, said multi-passage tube comprising inner and outer tubes defining the fluid passages therein, at least said outer tube being made of a metal, and engaging means for inserting said inner and outer tubes in said body to provide communication between the fluid passages of the multi-passage tube and the fluid passages of said body.

A still further object of the present invention is to provide a coupling for a multi-passage tube having a plurality of fluid passages, comprising a body including at least one fluid passage and having first and second fastening means each having a plurality of fluid passages, said first fastening means having tubes connected respectively to said fluid passages thereof for engaging the multi-passage tube and also having sharp annular ridges on said tubes for engaging the multi-passage tube, said first and second fastening means being insertable through said body and threadable in fluid passages of an object to which the multi-passage tube is to be coupled, the arrangement being such that said first fastening means communicates the fluid passages of the multi-passage tube with said fluid passage of said body and the fluid passages of said object through the fluid passages of said first fastening means, and said second fastening means communicates the fluid passages of said body with the fluid passages of said object through the fluid passages of said second fastening means.

Yet another object of the present invention is to provide a coupling for a multi-passage tube having a plurality of fluid passages, comprising a bolt and a body, said body having at least two fluid passage defined therein and tubes projecting therefrom and communicating respectively with said fluid passages of the body, said tubes having sharp annular ridges for engaging the multi-passage tube, said bolt being insertable in one of said fluid passages of said body and having a hole for communication with said one fluid passage, the arrangement being such that said body can be coupled to an object having a fluid passage by threading and tightening said bolt into said fluid passage of the object, and said fluid passages of the body and said fluid passages of the object are held in communication with each other through said hole of the bolt.

A yet still further object of the present invention is to provide a coupling for a multi-passage tube having a plurality of fluid passages, comprising a body including at least one fluid passage and having first and second fastening means having respective fluid passages, said first fastening means and said body having respective tubes projecting therefrom for engaging the multi-passage tube and also having sharp annular ridges on said tubes for engaging the multi-passage tube to communicate with said fluid passages thereof, a chuck member disposed around said tubes at said annular ridges for preventing the multi-passage tube from being detached, and a release bushing disposed on said chuck member for releasing said chuck member, the arrangement being such that said first fastening means is threaded into a fluid passage defined in an object to which the multi-passage tube is to be coupled for providing communication between one of the fluid passages of the multi-passage tube and the fluid passage of said object through the fluid passage of said first fastening means, said second fastening means is inserted in a hole defined in an end of said chuck member and then threaded in the fluid passage of said object for providing communication between the fluid passage of said body and the fluid passage of said object through said hole and for firmly holding said chuck member.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
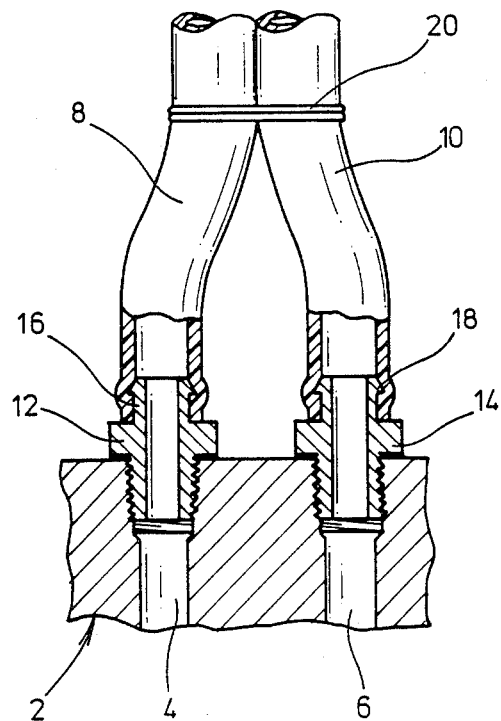
FIG. 1 is a fragmentary cross-sectional view of a conventional arrangement in which tubes are connected to a fluid-pressure-operated device.
Figure 2:
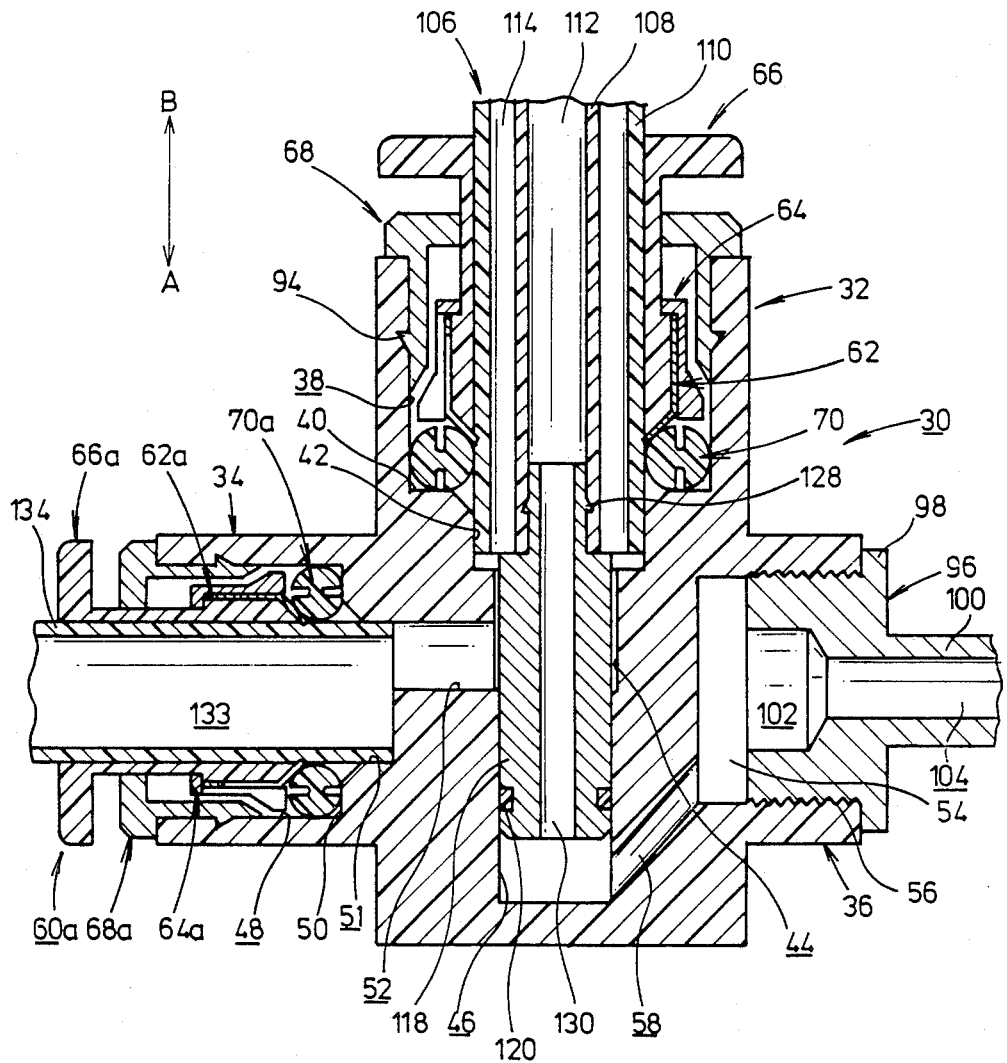
FIG. 2 is a fragmentary vertical cross-sectional view of a coupling for a multi-passage tube according to the present invention.

As shown in FIG. 2, a coupling for a multi-passage tube according to the present invention includes a body 30 made of a synthetic resin material and comprises a first cylindrical portion 32 projecting upwardly in the vertical direction, and second and third cylindrical portions 34, 36 disposed on opposite horizontal sides and projecting outwardly. The first cylindrical portion 32 has a first hole 38 of a larger diameter defined axially therein for inserting a multi-passage tube therein, a second hole 42 of a smaller diameter extending from one end of the first hole 38 through a step 40 toward the center of the body 30, a third hole 44 of a smaller diameter extending from one end of the second hole 42 through a step, and a fourth hole 46 of a smaller diameter extending from one end of the third hole 44 through a step for inserting a coupling member therein.

The second cylindrical portion 34 has a hole 48 of a larger diameter defined axially therein, a hole 51 of a small diameter extending from one end of the hole 48 through a step 50, and a passage 52 of a smaller diameter extending from one end of the hole 51 out of axial alignment with the holes 48, 51. The passage 52 is held in communication with the hole 44. The third cylindrical portion 36 has a hole 54 defined axially therein and having an inner wall surface formed with internal threads 56 over a given axial length. A passage 58 extends obliquely from one end of the hole 54 and communicates with the fourth hole 46.

A tube connecting mechanism 60 is mounted in the first cylindrical portion 32 of the body 30 thus constructed. The tube connecting mechanism 60 is illustrated in greater detail in FIG. 3. A ring seal member 70 is seated on the step 40 and has grooves 72a, 72b defined in and along the circumferential upper and lower end surfaces thereof for an increased sealing capability. The ring seal member 70 should preferably be made of an elastomeric material such as natural rubber or synthetic rubber. The tube connecting mechanism 60 is essentially composed of a chuck member 62, a collet 64, a release bushing 66, and a guide member 68. The chuck member 62 is comprised of a resilient metal plate formed into an annular shape. The chuck member 62 has a body 74, from one end of which an annular claw 76 is bent at an angle radially inwardly. The chuck member 64 also has a plurality of slits 78 defined axially in the body 74 and the annular claw 76, thereby making the annular claw 76 flexible radially inwardly and outwardly. It is preferable that the annular claw 76 be sharpened as can be well understood from FIG. 3.

The collet 64 is made of a synthetic resin material and fitted over the chuck member 62. The collet 64 comprises an annular body 80 having a plurality of slits 81 angularly spaced at equal intervals and a thicker bulging portion 82 on one end thereof which is directed radially outwardly. The annular body 80 also has an annular flange 83 on the opposite end.

The release bushing 66 is made of a synthetic resin material and is of a cylindrical shape. The release bushing 66 has a large-diameter flange 84 on its upper end which is directed radially outwardly, and an edge 86 on the lower end which is inclined at an angle that is smaller than the angle of inclination of the annular claw 76 of the chuck member 62. The release bushing 66 also has a plurality of slits 88 defined therein and extending from an intermediate position on the cylindrical body axially toward the edge 86. The wall thickness of the release bushing 66 is reduced between the slits 88 and the flange 84 to provide an annular step 90. Therefore, the diameter of the release bushing 66 can be reduced by pressing the reduced-thickness portion thereof radially inwardly. With the diameter thus reduced, the release bushing 66 can be fitted into the chuck member 62 and the collet 64. After the release bushing 66 has been fitted in the chuck member 62 and the collet 64, the release bushing 66 is released of the pressing force, whereupon the chuck member 62 and the collet 64 are securely mounted on the release bushing 66.

The guide member 68 is in the form of a sleeve having a flange 92 extending radially inwardly from one end thereof with a hole defined centrally in the flange 92. The guide member 68 also has an annular ridge 94 on its outer periphery.

A tube connecting mechanism 60a is mounted in the second cylindrical portion 34. The tube connecting mechanism 60a is identical in construction to the tube connecting mechanism 60. Therefore, the same components of the tube connecting mechanism 60a as those of the tube connecting mechanism 60 are denoted by the same reference numerals with a suffix "a", and will not be described in detail.

A connecting member 96 is held in threaded engagement with the internal threads 56 of the third cylindrical portion 36. As illustrated in FIG. 2, the connecting member 96 has external threads extending from a flange 98 to one end thereof for threaded engagement with the internal threads 56. The connecting member 96 also has an integral tube 100 on the side of the flange 98 remote from the external threads. The connecting member 96 defines therein a larger-diameter passage 102 located radially inwardly of the external threads and a passage 104 communicating with the larger-diameter passage 102.

Figure 3:
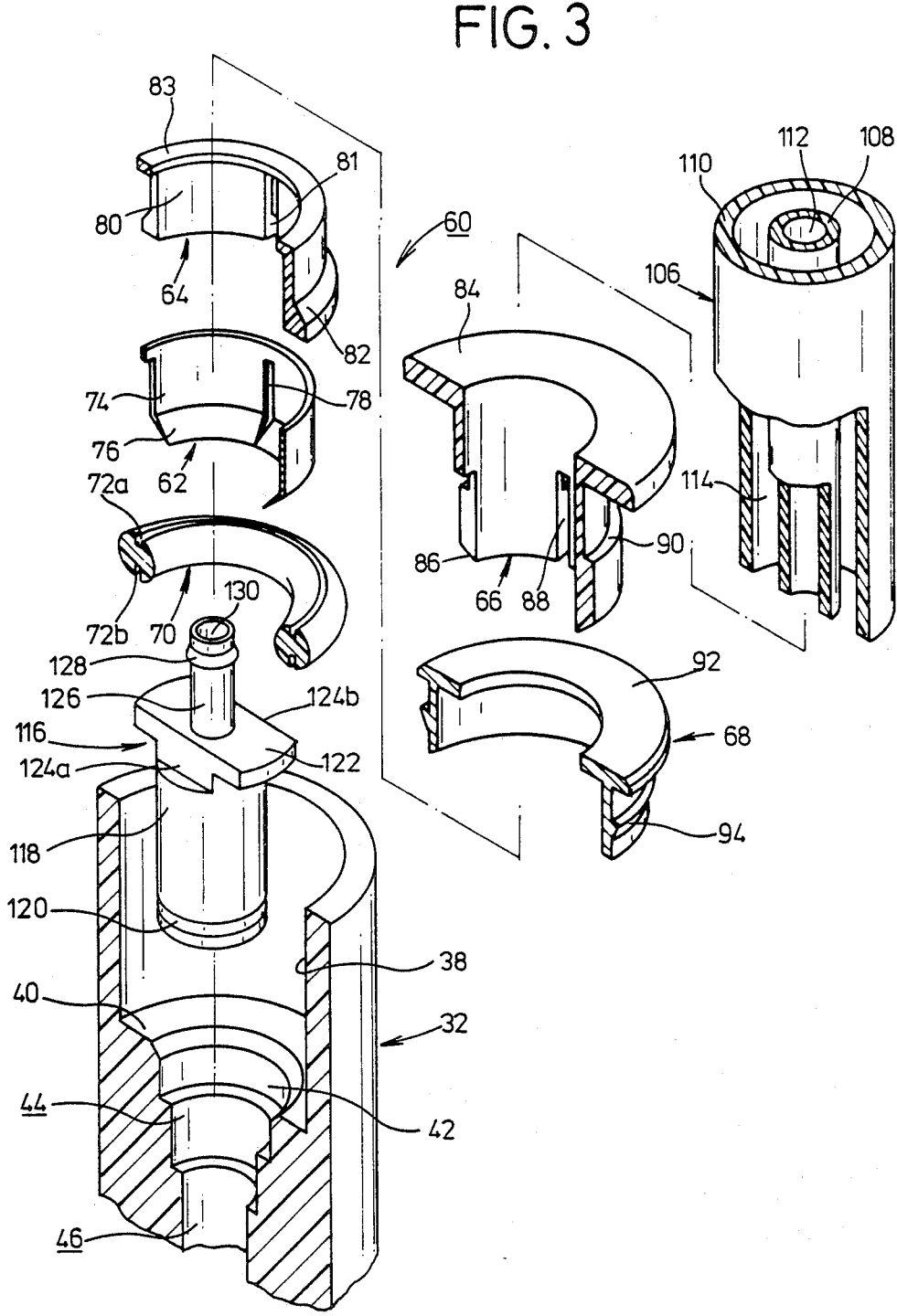
FIG. 3 is an exploded perspective view, partly cut away, of a multi-passage tube connecting mechanism of the coupling of the invention.

A multi-passage tube 106 is coupled to the tube connecting mechanism 60. The illustrated multi-passage tube 106 is of a double-walled tube assembly comprising an inner tube 108 and an outer tube 110. The inner tube 108 has a first passage 112 defined therethrough. A second passage 114 is defined between the inner and outer tubes 108, 110. A coupling member 116 engages the inner and outer tubes 108, 110. As shown in FIGS. 2 and 3, the coupling member 116 has a cylindrical portion 118 fitted in the fourth hole 46, and an O-ring 120 is fitted in an annular groove defined in the cylindrical portion 118 adjacent to one end thereof. The coupling member 116 has a flange-shaped engagement portion 122 on the other end thereof, the engagement portion 122 having recesses 124a, 124b. The coupling member 116 also includes a smaller-diameter cylindrical portion 126 projecting from one end of the engagement portion 122 and having an annular ridge 128 on the outer periphery thereof. A passage 130 is defined axially centrally through the coupling member 116.

When the cylindrical portion 126 is fitted in the inner tube 108 of the multi-passage tube 106, the annular ridge 128 engages the inner wall surface of the inner tube 108, which is then securely anchored to the coupling member 116. The engagement portion 122 has its opposite ends engaging the outer tube 110. Therefore, the inner and outer tubes 108, 110 are securely held by the coupling member 116. A single tube 134 is coupled to the tube connecting mechanism 60a.

The coupling according to the present invention is basically constructed as described above. Operation and advantages of the coupling will be described below.

The multi-passage tube 106 is first coupled to the body 30. More specifically, the coupling member 116 is inserted through the release bushing 66 and fitted through the second hole 42 and the third hole 44 into the fourth hole 46. The outer tube 110 is pushed in as it spreads out the annular claw 76 of the chuck member 62 and the sleeve 80 of the collet 64 against their resilient forces. The multi-passage tube 106 is completely mounted when the engagement portion 122 of the coupling member 116 abuts against the step lying between the second and third holes 42, 44. At this time, the annular claw 76 of the chuck member 62 is thrust into the outer tube 110 under its own resiliency and the resiliency of the sleeve 80 of the collet 64. Therefore, the multi-passage tube 106 is securely retained in plate in the tube connecting mechanism 60 against removal therefrom. When the multi-passage tube 106 is subjected to outer forces tending to displace the same in the direction of the arrow B, the bulging portion 82 of the collet 64 is caused to abut against the lower end of the guide member 68, thereby tending to displace the collet 64 and the chuck member 62 radially inwardly. However, since the chuck member 62 and the collet 64 are held on the cylindrical portion of the release bushing 66 below the step 90, the bulging portion 82 engages the release bushing 66 to prevent the multi-passage tube 106 from being dislodged from the tube connecting mechanism 60.

By thus mounting the multi-passage tube 106 in the body 30, the first passage 112 of the inner tube 108 is brought into communication with the passage 58 via the passage 130 of the coupling member 116 and, in turn, with the passage 104 of the connecting member 96.

The second passage 114 is brought into communication with the third hole 44 through the recesses 124a, 124b of the engagement portion 122 and, in turn, with the passage of the single tube 134 through the passage 52.

Where the multi-passage tube 106 is connected to a solenoid-operated valve or the like, and the single tube 134 and the tube 100 are connected to actuators (not shown), respectively, a fluid under pressure from the first passage 112 of the inner tube 108 can be delivered through the passages 130, 58 into the tube 100, from which the fluid can be supplied to one of the non-illustrated actuators which is joined to the tube 100. A fluid supplied under pressure to the second passage 114 is fed through the third hole 44 and the passage 52 into the single tube 134, from which the fluid is supplied to the actuator coupled thereto.

For detaching the multi-passage tube 106 from the body 30, the release bushing 66 of the tube connecting mechanism 60 is pushed in the direction of the arrow A toward the body 30. The release bushing 66 is displaced in the direction of the arrow A to cause the inclined edge 86 to spread the annular claw 76 radially outwardly out of thrusting engagement with the outer tube 110, whereupon the multi-passage tube 106 can easily be removed from the tube connecting mechanism 60.

Figure 4:
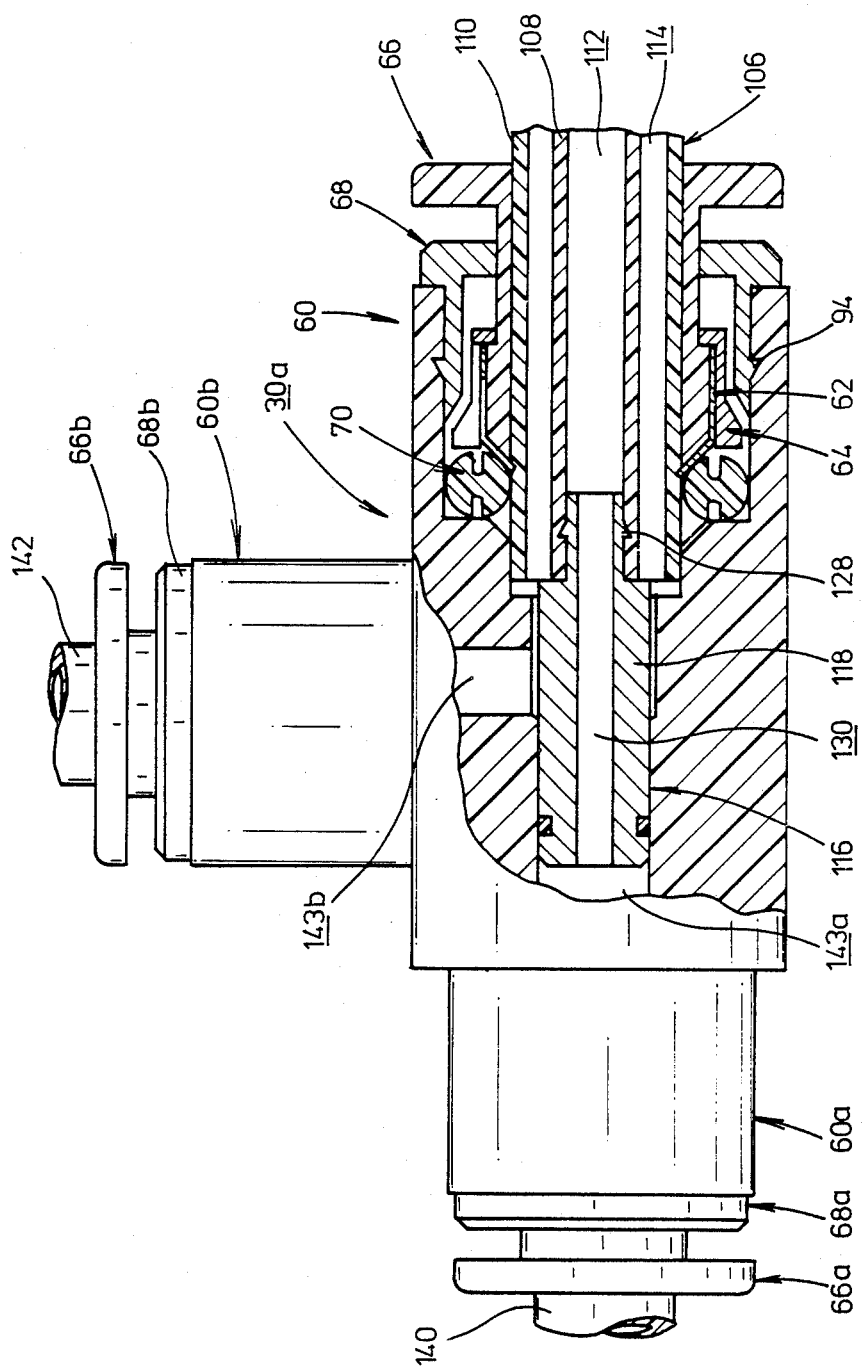
FIG. 4 is a fragmentary vertical cross-sectional view of a coupling for a multi-passage tube according to another embodiment of the present invention.

A multi-passage tube coupling according to another embodiment of the present invention is illustrated in FIG. 4. The multi-passage tube 106 is detachably coupled to the tube connecting mechanism 60 disposed horizontally in a body 30a. A single tube 140 is coupled to the tube connecting mechanism 60 in opposite relation to the multi-passage tube 106. Another tube connecting mechanism 60b is disposed on an upper portion of the body 30a in perpendicular relation to the tube connecting mechanisms 60, 60a. A single tube 142 is detachably coupled to the tube connecting mechanism 60b.

The tube connecting mechanism 60b is identical in construction to the tube connecting mechanism 60a. The first passage 112 of the multi-passage tube 106 is held in communication with the passage of the single tube 140 through the passage 130 of the coupling member 116 and a passage 143a defined in the body 30a. The second passage 114 of the multi-passage tube 106 is held in communication with the passage of the single tube 142 through a passage 143b defined in the body 30a. The tube connecting mechanism 60 may be disposed in place of the tube connecting mechanism 60b. Stated otherwise, the multi-passage tube 106 and the single tubes 140, 142 may be attached as desired for an effective tubing arrangement in view of the configuration of actuators to be coupled to the body 30a and the position in which the body 30a is located.

Figure 5:
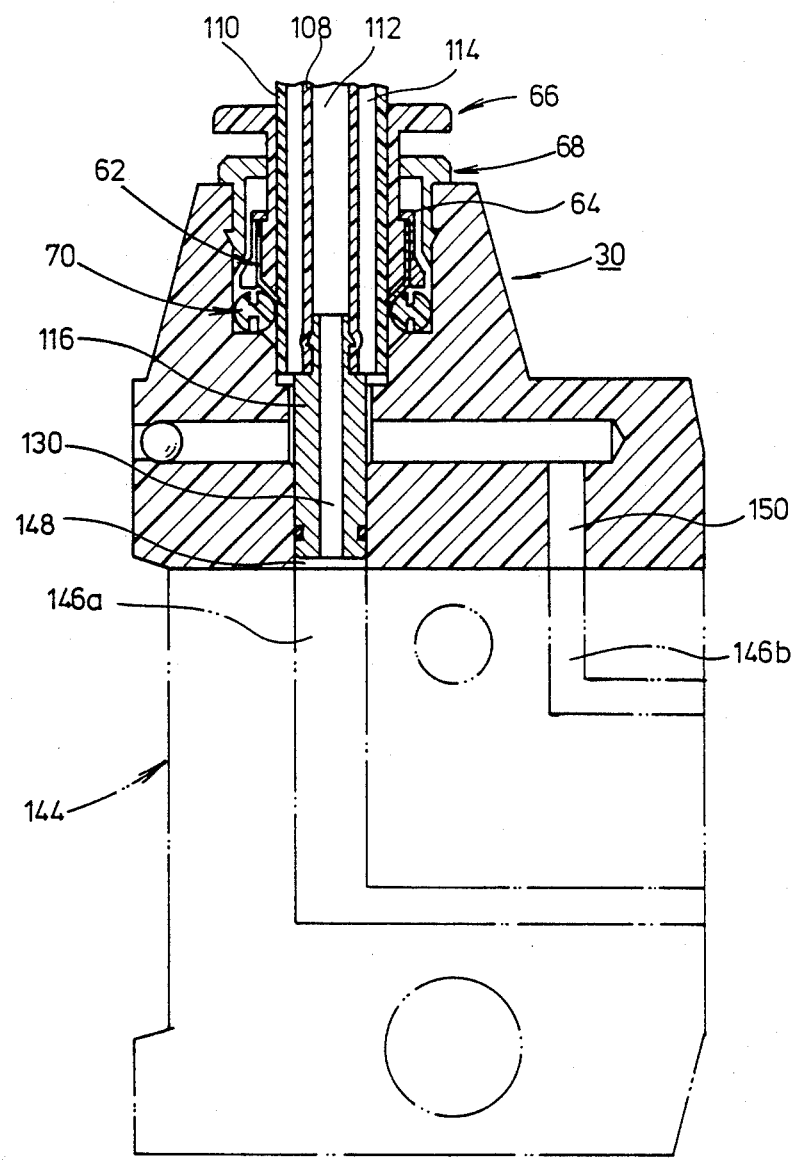
FIG. 5 is a fragmentary vertical cross-sectional view of a coupling for a multi-passage tube according to still another embodiment of the present invention.

FIG. 5 shows a multi-passage tube coupling according to still another embodiment of the present invention. According to this embodiment, a body 30 is integrally formed with a solenoid-operated valve manifold 144. The body 30 has passages 148, 150 communicating respectively with fluid supply passages 146a, 146b in the manifold 144. The first passage 112 of the multi-passage tube 106 is held in communication with the passage 146a through the passage 148, and the second passage 114 of the multi-passage tube 106 is held in communication with the passage 146b through the passage 150. Wit the multi-passage tube 106 connected to a fluid cylinder, not shown, a fluid under pressure can be supplied by the solenoid-operated valve manifold 144 via the passage 146a or 146b to the passage 112 or 114 for driving the non-illustrated fluid cylinder.

Figure 6:
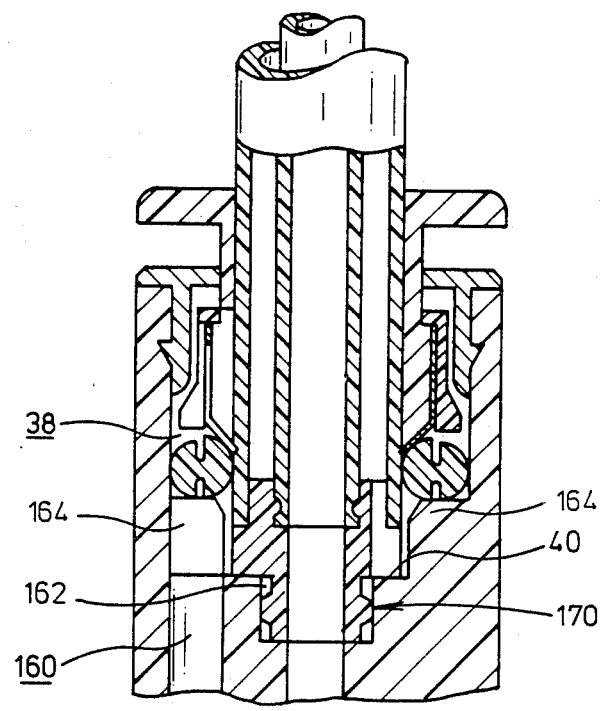
FIG. 6 is a fragmentary vertical cross-sectional view of a coupling for a multi-passage tube according to a still further embodiment of the present invention, the multi-passage tube being coupled to a connecting mechanism.
Figure 8:
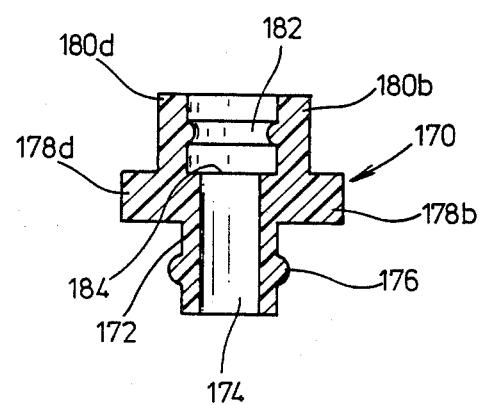
FIG. 8 is a vertical cross-sectional view of a plug member shown in FIGS. 6 and 7.
Figure 7:
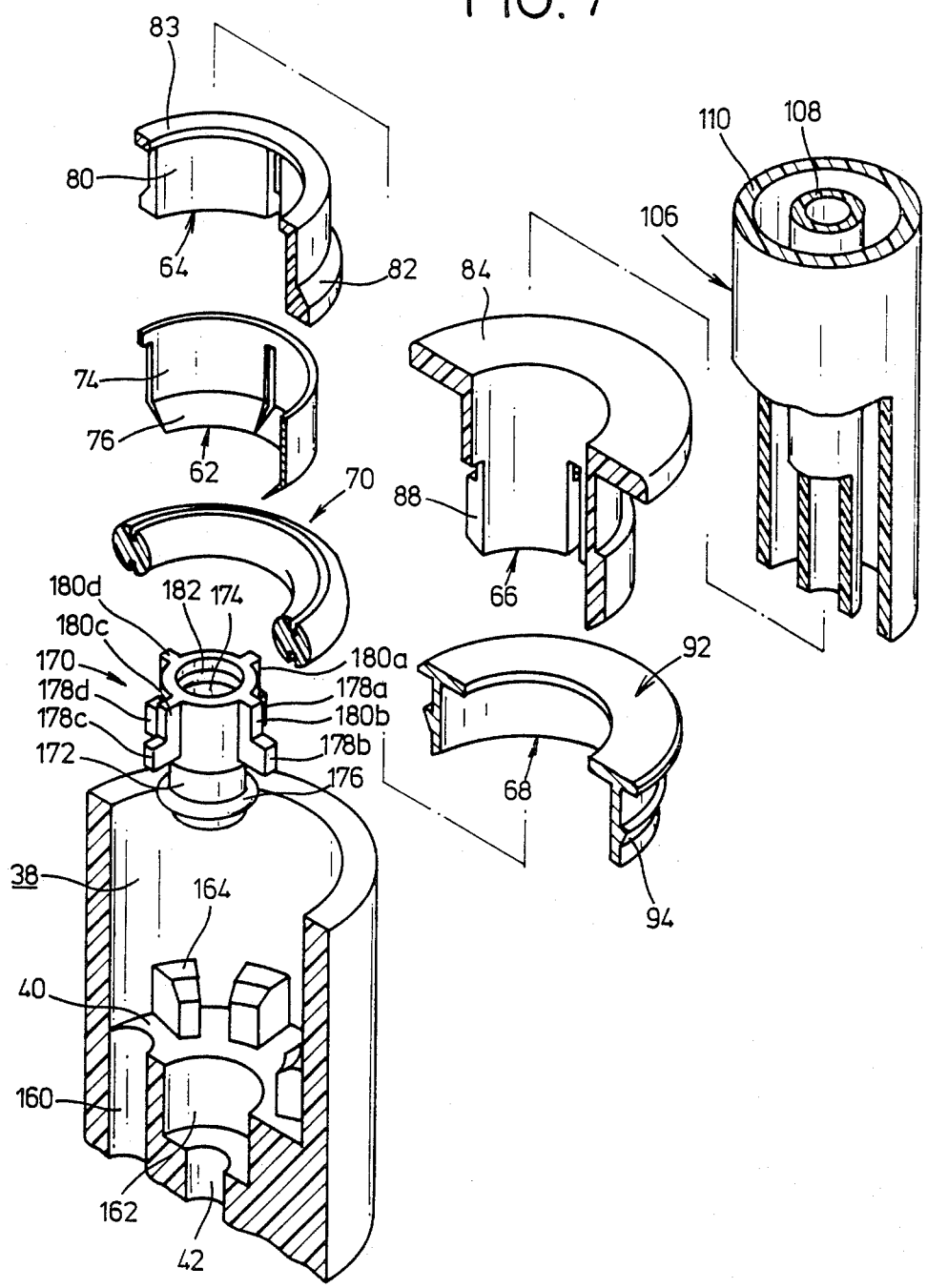
FIG. 7 is an exploded perspective view, partly cut away, showing the correlationship between the multi-passage tube and the connecting mechanism illustrated in FIG. 6.

FIGS. 6, 7, and 8 illustrate still another embodiment in which a multi-passage tube coupling employs a body and a coupling member which are different from those shown in FIG. 2. The other parts in FIGS. 6 through 8 which are identical to those shown in FIG. 2 are denoted by the identical reference characters and will not be described in detail.

The body 30 has a passage 160 extending from the bottom of the first axial hole 38 parallel to the second hole 42. An annular groove 162 is defined between the first and second holes 38, 42. On the step 40, there are disposed a plurality of seats 164 angularly spaced at equal intervals in the circumferential direction and extending axially of the body 30, each of the seats 164 having an inclined surface.

A coupling member 170 is fitted into the body 30 through the first hole 38. The coupling member 170 includes a cylindrical body 172 and has a central passage 174 extending axially therethrough. The cylindrical body 172 has an annular bulging portion 176 on its lower end portion, the bulging portion 176 having a curved surface. A plurality of stoppers 178a through 178d are provided on the cylindrical body 172 above the bulging portion 176, the stoppers 178a through 178d projecting radially outwardly. Spacers 180a through 180d are integrally formed respectively with the stoppers 178a through 178d. Each stopper and spacer pair is of an integral L-shape disposed on the cylindrical body 172. An engagement portion 182 is disposed in an upper portion of the coupling member 170 for pressing the inner tube of the multi-passage tube.

The manner in which the multi-passage tube 106 is inserted into the body 30 will be described below.

The lower end of the multi-passage tube 106 is cut off at 90° to the axis thereof, i.e., perpendicularly to the axis thereof with an ordinary cutter knife. The inner tube 108 of the multi-passage tube 106 is inserted into the axial passage 174 of the coupling member 170 toward the center of the coupling member 170. As a result, the inner tube 108 is caused to flex slightly radially inwardly by the engagement portion 182, and is securely held by the cylindrical body 172. The outer tube 110 is fitted over the coupling member 170 and engaged by the upper shoulders of the stoppers 178a through 178d projecting radially outwardly from the cylindrical body 172. The outer tube 110 is therefore retained on the coupling member 170 while being spaced at a distance from the cylindrical body 172 by the spacers 180a through 180d above the respective stoppers 178a through 178d. As shown in FIG. 8, a step 184 may be defined in the cylindrical body 172 at the same height as that of the upper surfaces of the stoppers 178a through 178d, so that the multi-passage tube 106 with the inner and outer tubes 108, 110 cut to the same length can easily be retained, without changing their length, on the cylindrical body 172.

The coupling member 170 with the multi-passage tube 106 assembled therein is then forced into the annular groove 162. Thereafter, the seal 70, the chuck member 62, the collet 64, the release bushing 66, and the guide member 68 are assembled into the first hole 38, as shown in FIG. 2. They are mounted in advance on the multi-passage tube 106. Therefore, after the coupling member 170 is fitted in the first hole 38, the seal 70 is seated on the step 40. The seal 70, the chuck member 62, the collet 64, the release bushing 66, and the guide member 68 are held in engagement in the same manner as described above with reference to the embodiment of FIG. 2.

With the components thus assembled together, the passage 174 of the coupling member 170 communicates with the passages 102, 104 via the passage 58 (FIG. 2). The passage 114 defined between the inner and outer tubes 108, 110 communicates with the passage 52 through the passage 160. Therefore, where the first and second cylindrical portions 34, 36 are connected respectively to fluid cylinder ports in the same manner as described above, pistons (not shown) in the fluid cylinders can be driven by air introduced under pressure through the fluid cylinder ports.

Figure 9:
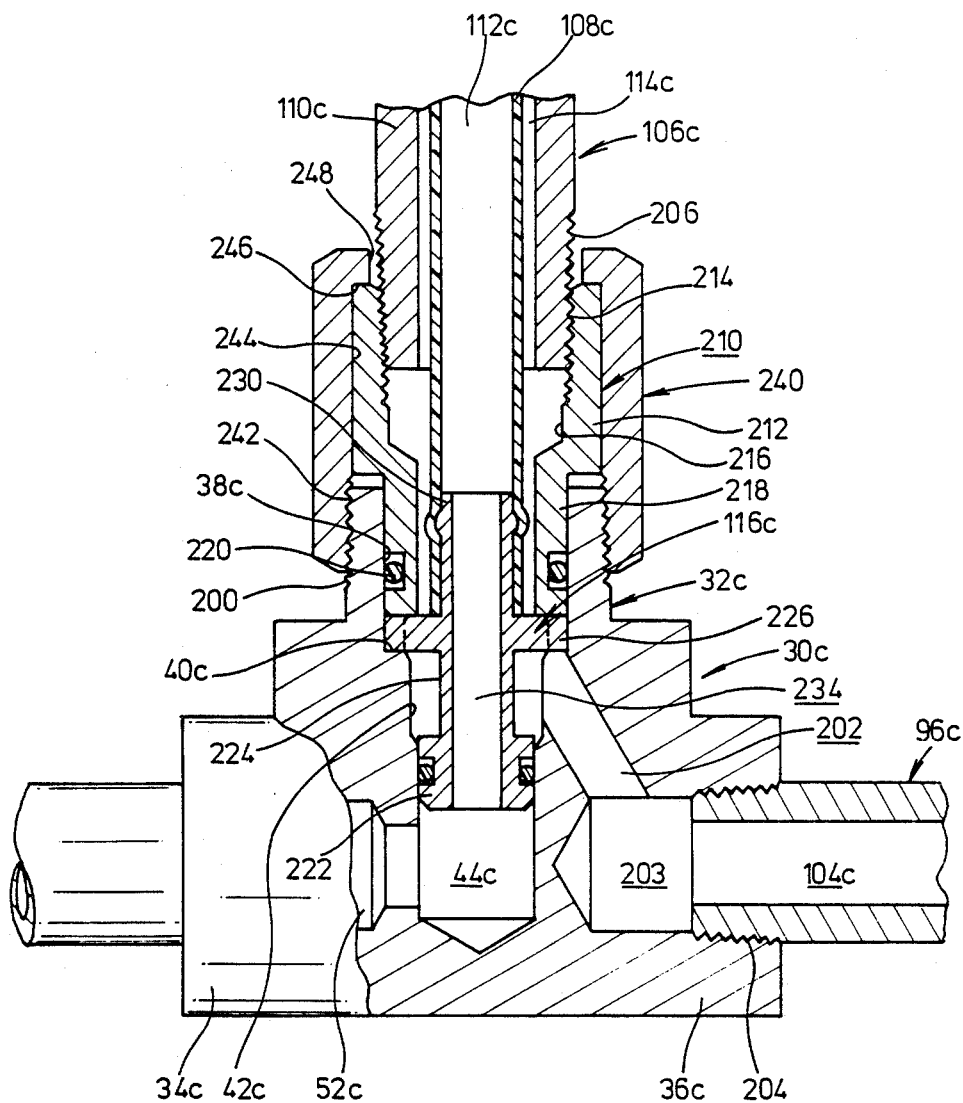
FIG. 9 is a fragmentary vertical cross-sectional view of a coupling for a multi-passage tube according to another embodiment of the present invention.
Figure 10:
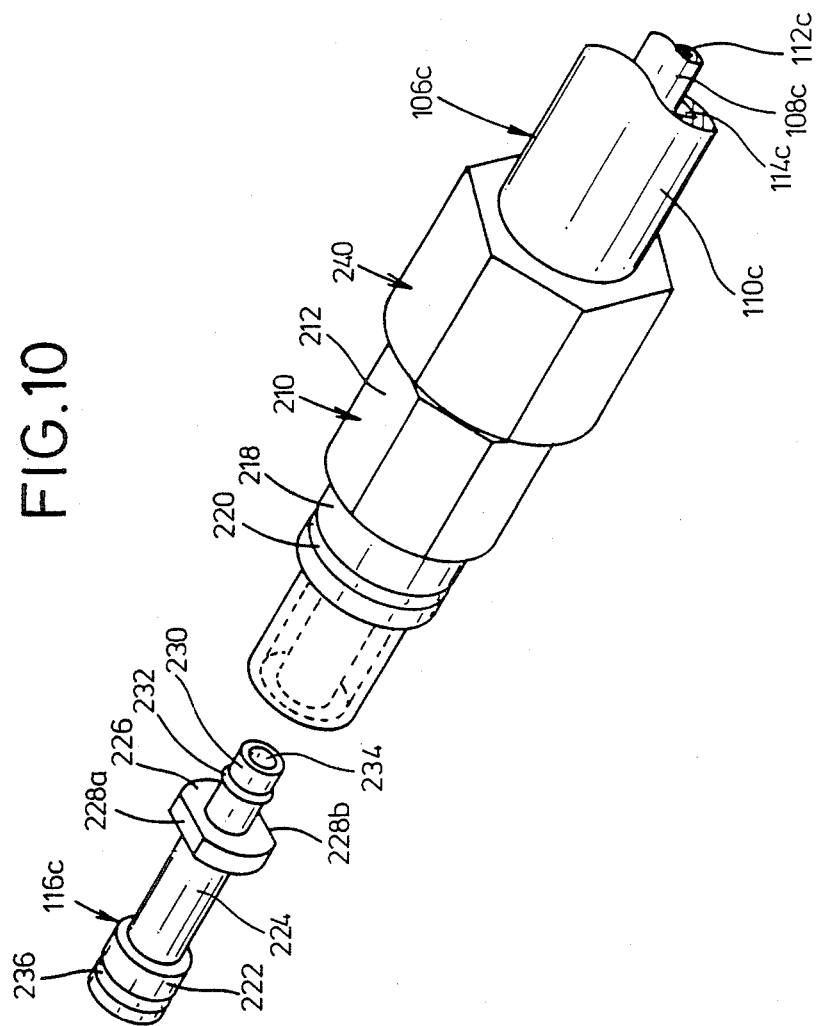
FIG. 10 is an exploded perspective view of a multi-passage tube and a coupling member.

FIGS. 9 and 10 show a coupling for a multi-passage tube according to a still further embodiment of the present invention. In this embodiment, the multi-passage tube is composed of an inner tube made of a flexible material such as synthetic resin and an outer tube made of a metal. A fluid introduced and discharged through such multi-passage tube is supplied to pneumatically operated devices.

As shown in FIG. 9, the coupling includes a body 30c made of a metal. A first cylindrical portion 32c projects upwardly in the vertical direction from the body 30c. The first cylindrical portion 32c has external threads 200 and a first hole 38c defined axially theretrough. A second hole 42c of a smaller diameter is defined in the body 30c and extends from one end of the first hole 38c through a step 40c. A third hole 44c of a smaller diameter is also defined in the body 30c and extends through a step from one end of the second hole 42c, the third hole 44c communicating with a passage 52c extending from the lower end portion of the body 30c into a second cylindrical portion 34c. A passage 202 is defined in the body 30c and extends obliquely downwardly from the second hole 42c into communication with a passage 203 defined in a third cylindrical portion 36c. The passage 203 has internal threads 204 with which a tube 96c of a metal is held in threaded engagement. As shown in FIG. 9, the internal threads 204 are defined on a tapered inner surface, and external threads on the tube 96c for threaded engagement therewith are defined on a tapered outer surface of the tube 96c. The tube 96c has a passage 104c defined therethrough. A tube coupled to the second cylindrical portion 34c should preferably be made of a metal.

The multi-passage tube 106c is coupled to the body 30c through the first cylindrical portion 32c. As described above, the multi-passage tube 106c comprises a double-walled tube composed of an inner tube 108c made of a flexible synthetic resin material and an outer tube 110c made of a metal such as steel. The multi-passage tube 106c has therein a passage 112c defined in the inner tube 108c and a passage 114c defined between the inner and outer tubes 108c, 110c. The outer tube 110c has external threads 206 defined on the lower end portion thereof over a prescribed length thereof. The inner and outer tubes 108c, 110c are joined together to the cylindrical portion 32c through an engagement means 210. The engagement means 210 comprises a plug member 212 and a coupling member 116c. The plug member 212 has a central hole defined by a peripheral wall on which internal threads 214 are defined axially. The plug member 212 also has a smaller-diameter hole 216 extending through a step from one end of the internal threads 214. The plug member 212 includes a smaller-diameter cylindrical portion 218 extending axially from one end thereof through a step. An O-ring 220 is inserted in an annular groove defined in an outer circumferential surface of the cylindrical portion 218.

The coupling member 116c has a distal end 222 fitted in the third hole 44c, a smaller-diameter portion 224 extending from the distal end 222 through a step, and a flange-shaped stopper 226 on the terminal end of the smaller-diameter portion 224. The stopper 226 has recesses 228a, 228b (FIG. 10). A smaller-diameter cylindrical portion 230 extends axially from one end of the stopper 226, and has an annular ridge 232 on the outer circumferential surface thereof.

The coupling member 116c has a central passage 234 extending axially therethrough. An O-ring 236 is fitted around the distal end 222 for providing an air-tight seal around the coupling member 116c fitted in the third hole 44c.

An attachment member 240 is provided on the multi-passage tube 106c for secure connection to the body 30c. As depicted in FIG. 10, the attachment member 240 is of a tubular shape having a polygonal profile. The attachment member 240 has internal threads 242 defined on an inner wall surface and extending in the axial direction, and a hole 244 defined therein and extending from one end of the internal threads 242. The attachment member 240 also has a smaller-diameter hole 248 extending from one end of the hole 244 through a step 246, the hole 248 communicating with the hole 244.

Operation and advantages of the embodiment shown in FIGS. 10 and 11 will hereinafter be described.

The multi-passage tube 106c is assembled in the following manner: The attachment 240 is loosely fitted over the multi-passage tube 106c from the end of the outer tube 110c, followed by bringing the external threads 206 of the outer tube 110c in threaded engagement with the internal threads 214 of the plug member 212. The inner tube 108c is then inserted into the outer tube 11c, and the end of the inner tube 108c is cut off in alignment with the distal end of the plug member 212. The cylindrical portion 230 of the coupling member 116c is inserted into the end of the inner tube 108c, whereupon the coupling member 116c is secured to the inner tube 108c by the annular ridge 232. As a consequence, the stopper 226 engages the distal end of the plug member 212, and hence the inner and outer tubes 108c, 11c are fixed in position.

After the engagement means 210 and the attachment 240 have been mounted on the multi-passage tube 106c, the coupling member 116c is fixedly fitted in the third hole 44c of the body 30c. Specifically, the attachment 240 is turned to bring its internal threads 242 into threaded engagement with the external threads 200 of the cylindrical portion 32c, whereby the multi-passage tube 106c is coupled to the body 30c. At this time, the stopper 226 of the coupling member 116c is held against the step 40c, and the plug member 212 is pressed against the step 246 of the attachment 240. Consequently, the multi-passage tube 106c is firmly and reliably coupled to the body 30c. The fitted components are sealed in an air-tight and liquid-tight manner since the O-rings 220, 236 are fitted respectively over the plug member 212 and the coupling member 116c.

When the multi-passage tube 106c is coupled to the body 30c, the passage 112c defined by the inner tube 108c communicates with the third hole 44c and the passage 52c through the passage 234 of the coupling member 116c and then with the tube coupled to a solenoid-operated valve manifold, for example. The passage 114c defined between the inner and outer tubes 108c, 110c communicates with the second hole 42c via the recesses 228a, 228b of the stopper 226 and then with the passage 104c of the tube 96c through the passages 202, 203. The tube 96c may be coupled to a passage in the solenoid-operated valve manifold (not shown). Inasmuch as the multi-passage tube 106c is firmly fixed to the body 30c by the attachment 240, the multi-passage tube 106c is prevented from being accidentally disconnected from the solenoid-operated valve manifold during its operation. The outer tube 110c of steel also serves to protect the multi-passage tube 106c from being damaged by external forces applied thereto. For removing the multi-passage tube 106c from the body 30c, the attachment 240 is turned in the direction opposite to that in which it was turned when it was connected to the body 30c, so that the threads 242 are disengaged from the threads 200. Thereafter, the multi-passage tube 106c is pulled away from the body 30c.

Figure 11:
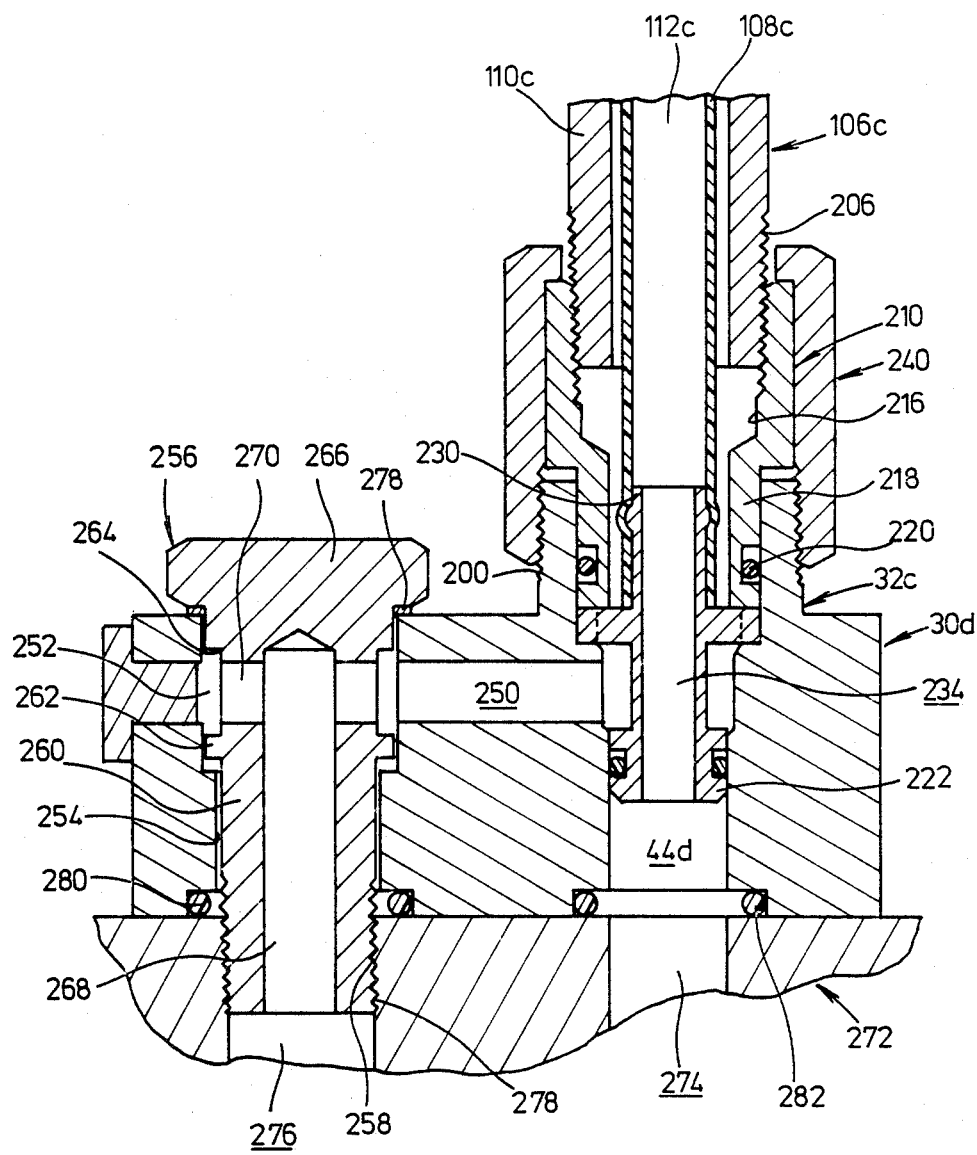
FIG. 11 is a fragmentary vertical cross-sectional view of a coupling for a multi-passage tube according to yet another embodiment of the present invention.

A multi-passage tube coupling according to a yet further embodiment of the present invention is illustrated in FIG. 11. Those reference characters in FIG. 11 which are identical to those used in the preceding embodiment denote identical parts.

In the embodiment of FIG. 11, the passage 202 is not provided for communication between the tube 96c coupled to the third cylindrical portion 36c and the passage defined between the inner and outer tubes 108c, 110c. However, a body 30d has a passage 250 defined therein for communicating a passage defined between inner and outer tubes 108d, 110d with another region.

More specifically, the body 30d has a hole 252 defined therein and extending in the vertical direction, and a hole 254 communicating with the hole 252. A fixed member 256 is inserted in position through the holes 252, 254. The fixed member 256 has external threads 258 on its outer circumference at one end thereof and a cylindrical portion 260 extending from a terminal end of the external threads 258. From one end of the cylindrical portion 260, there extends a larger-diameter cylindrical portion 262 through a step, which projects radially outwardly and has a circumferential groove 264. One end of the cylindrical portion 262 has a hexagonal head 266. The fixed member 256 has a central passage 268 defined axially therein and extending to a prescribed axial depth. The passage 268 communicates with the circumferential groove 264 through a passage 270 extending radially and communicating with the passage 268 perpendicularly. The circumferential groove 264 communicates with the passage 250. A solenoid-operated valve manifold 272 has passages 274, 276 for introducing and discharging a fluid under pressure. The passage 274 communicates with a hole 44d in the body 30d. The external threads 258 of the fixed member 256 are threaded in an internally threaded hole 278 in the passage 276, so that the fixed member 256 is secured to the solenoid-operated valve manifold 272. A seal 278 and O-rings 280, 282 are preferably inserted to provide air-tight or liquid-tight sealing between the fixed member 256 and the body 30d, between the third hole 44d and the passage 274, and the hole 254 and the threaded hole 278.

In operation, air introduced under pressure through a passage 112c defined in the passage 108c is supplied through the passage 234 directly into the passage 274 of the solenoid-operated valve manifold 272. A fluid fed under pressure from a passage 114c defined between the inner and outer tubes 108c, 110c is delivered through the passage 250 and the circumferential groove 264 into the passage 270. Since the passage 270 communicates with the passage 268, the fluid under pressure is supplied into the passage 276 of the solenoid-operated valve manifold 272.

Figure 12:
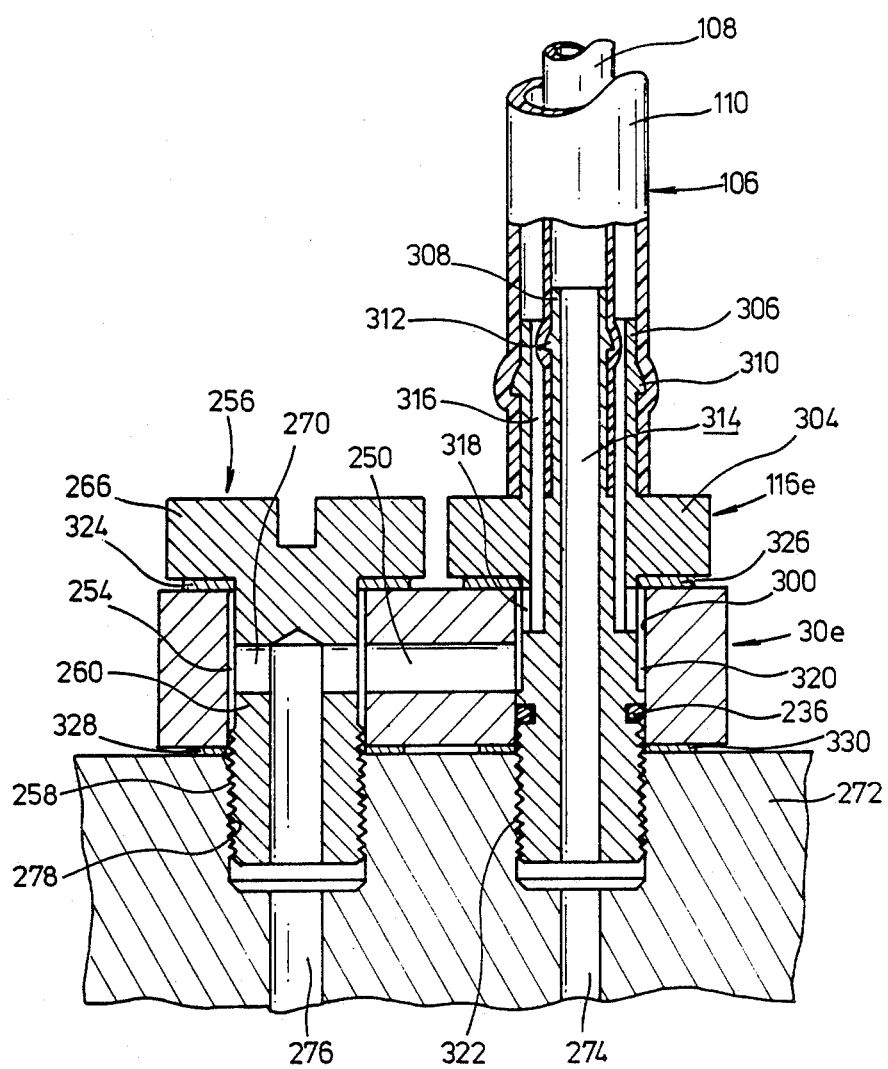
FIG. 12 is a fragmentary vertical cross-sectional view of a coupling for a multi-passage tube according to still another embodiment of the present invention.
Figure 13:
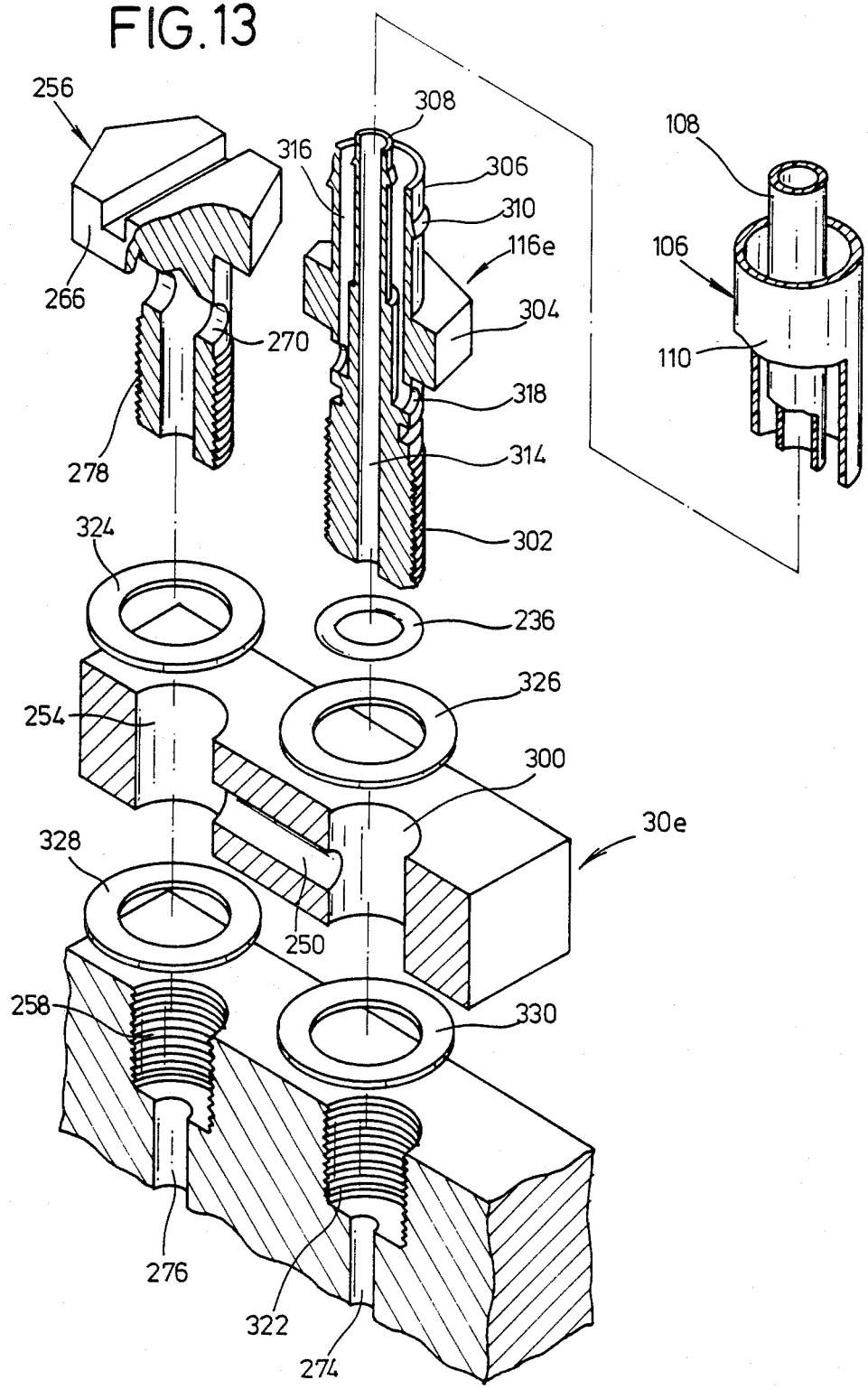
FIG. 13 is an exploded perspective view, partly cut away, showing the relationship between the multi-passage tube, a connecting mechanism, and a fluid-pressure-operated device illustrated in FIG. 12.

FIGS. 12 and 13 illustrate another embodiment of the present invention. Those reference characters in FIGS. 12 and 13 which are identical to those used in the preceding embodiment denote identical parts.

Although the embodiment of FIGS. 12 and 13 is similar to the embodiment of FIG. 11, a double-walled tube is composed of flexible inner and outer tubes, no attachment is employed, and a coupling member is exposed to external view according to the embodiment of FIGS. 12 and 13.

As shown in FIG. 13, a body 30e is of a substantially rectangular parallelepiped and has a hole 300 defined therein and in which a threaded portion 302 of a coupling member 116e is threaded. The coupling member 116e has, on its intermediate portion, a head 304 for being turned by a wrench (not shown), and, on its upper end, two integral tubes 306, 308 arranged in a double-walled construction and projecting upwardly. The tubes 306, 308 have respective annular ridges 310, 312 on the outer circumferential surfaces in the vicinity of the upper ends, the annular ridges 310, 312 having sharp edges. The annular ridges 310, 312 have surfaces inclined downwardly. The inner tue 308 is slightly higher than the outer tube 306 to allow the inner and outer tubes 108, 110 of the multi-passage tube 106 to be easily fitted thereover.

Fluid passages 314, 316 defined by the tubes 306, 308 extend concentrically into the coupling member 116e. The fluid passage 314 extends vertically downwardly into communication with the passage 274 of the solenoid-operated valve manifold 272. The fluid passage 316 has a lower end opening radially through a plurality of holes 318 defined in the coupling member 316 at circumferentially spaced relation. Therefore, when the coupling member 116e is fastened to the body 30e, the fluid passage 316 communicates with the fluid passage 250 through a circumferential clearance 320 defined between the outer circumferential surface of the coupling member 116e and the hole 300 of the body 30e. The solenoid-operated valve manifold 272 has internal threads 322 with which the threads 302 of the coupling member 116e are held in threaded engagement.

When a fluid such as air is fed under pressure from the multi-passage tube 106 through its inner passages 112, 114, it is delivered through the inner passage 314 of the inner tube 308 into the passage 274 of the solenoid-operated valve manifold 272. Air fed under pressure via the passage 316 is supplied into the passage 250 via the clearance 320 and then into the passage 276 of the solenoid-operated valve manifold 272. Now, air can be supplied under pressure from the solenoid-operated valve manifold 272 for driving actuators. Returning air under pressure is discharged via the passages 274, 276 into the multi-passage tube 106.

The multi-passage tube 106 can easily detached from the coupling of the invention by manually pulling it out while wiggling the same. Therefore, the multi-passage tube can easily be attached to and detached from the coupling.

Figure 14:
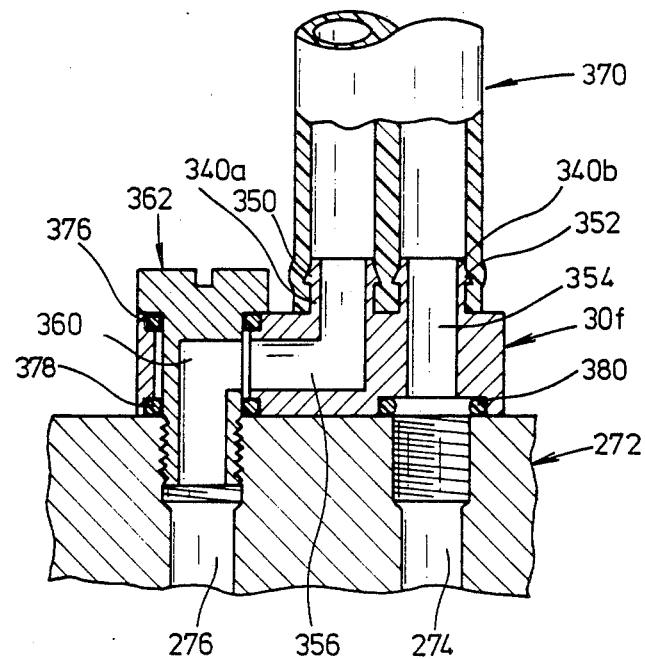
FIG. 14 is a fragmentary vertical cross-sectional view showing the manner in which a multi-passage tube, a connecting mechanism, and a fluid-pressure-operated device are coupled according to the present invention.
Figure 15:
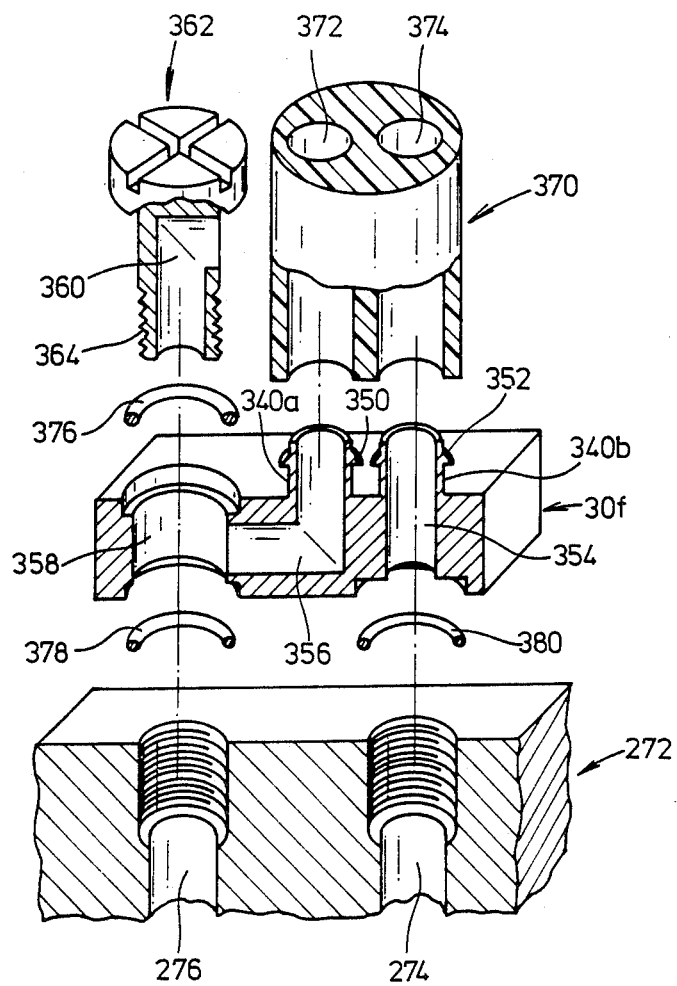
FIG. 15 is an exploded perspective view illustrative of the mutual relationship between the multi-passage tube, the connecting mechanism, and the fluid-pressure-operated device shown in FIG. 14.

FIGS. 14 and 15 show a multi-passage tube coupling according to still another embodiment of the present invention. Those parts in FIGS. 14 and 15 which are identical to those in the previous embodiments are denoted by identical reference characters.

The embodiment of FIGS. 14 and 15 is different from the previous embodiments in that a body and a coupling member for connecting a multi-passage tube to a solenoid-operated valve manifold or the like are of a unitary structure, and the multi-passage tube comprises two parallel tubes rather than a double-walled tube having inner and outer tubes. As shown in FIGS. 14 and 15, two coupling members 340a, 340b project from a body 30f and have annular ridges 350, 352 projecting radially outwardly from their distal end portions. The coupling member 340b has a passage 354 defined therethrough and extending into the body 30f, the passage 354 communicating with the passage 274 of the solenoid-operated valve manifold 272. The coupling member 340a has a passage 356 defined therethrough and bent in the body 30f into communication with a hole 358 defined vertically through the body 30f. A bolt-like fastening member 362 having a bent passage 360 defined therein is fitted in the hole 358. The fastening member 362 has external threads 364 defined on its distal end and threadedly engaging the passage 276 defined in the solenoid-operated valve manifold 272 parallel to the passage 274. A multi-passage tube 370 is fitted over the coupling members 340a, 340b.

Figure 16:
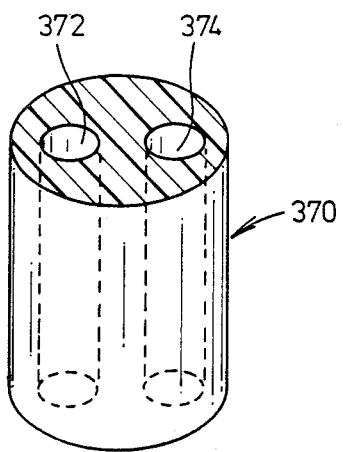
FIG. 16 is a perspective view, partly in cross section, of the multi-passage tube shown in FIGS. 14 and 15.

As shown in FIGS. 16, the multi-passage tube 370 is made of a flexible material and has two parallel passages 372, 372. Designated at 376, 378, 380 in FIGS. 14 and 15 are seal rings. By pushing the multi-passage tube 370 to allow the coupling members 340a, 340b to be fitted respectively into the tube passages 372, 374, the annular ridges 350, 352 are caused to engage the inner wall surfaces of the passages 372, 374, thereby retaining the multi-passage tube 370 in secure engagement with the coupling members 340a, 340b. The body 30f can be fastened to the solenoid-operated valve manifold 272 by turning the fastening member 362 to bring the threads 364 into threaded engagement with threads on the upper end of the passage 276. The seal rings 376, 378, 380 are disposed between the solenoid-operated valve manifold 272, the fastening member 262, and the body 30f to provide a sufficient air-tight sealing capability.

When air is introduced under pressure from the tube passage 372, it is delivered through the passage 356, the clearance between the fastening member 362 and the hole 358, and the passage 360 into the passage 276 for driving an actuator (not shown). Air introduced under pressure from the tube passage 374 is fed through the passages 354, 274 into an actuator (not shown) for driving the same.

For removing the multi-passage tube 370 from the body 30f, it is manually pulled while being wiggled. The multi-passage tube coupling in the embodiment of FIGS. 14 through 16 is particularly advantageous in that it requires a small installation space, allows the multi-passage tube to be coupled to the solenoid-operated valve manifold or the like, and hence can be handled with ease.

Figure 17:
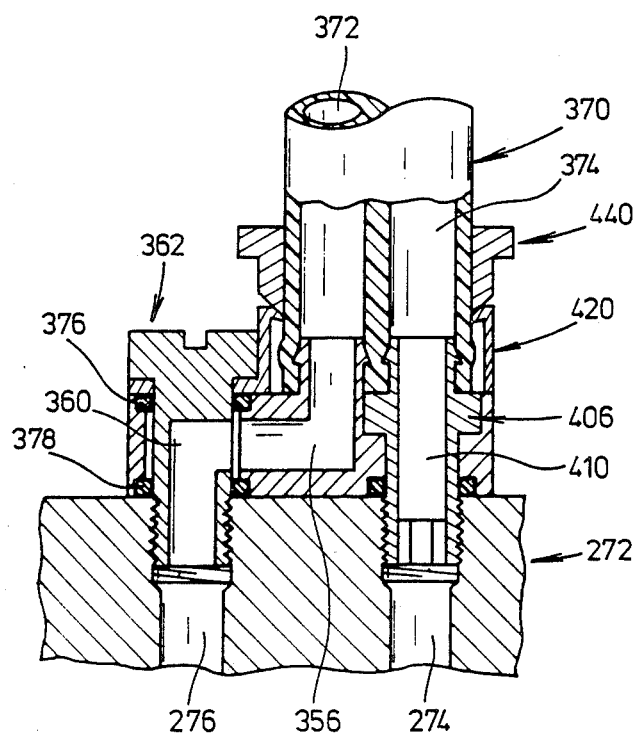
FIG. 17 is a fragmentary vertical cross-sectional view showing the manner in which a multi-passage tube, a connecting mechanism, and a fluid-pressure-operated device are coupled according to the present invention.
Figure 18:
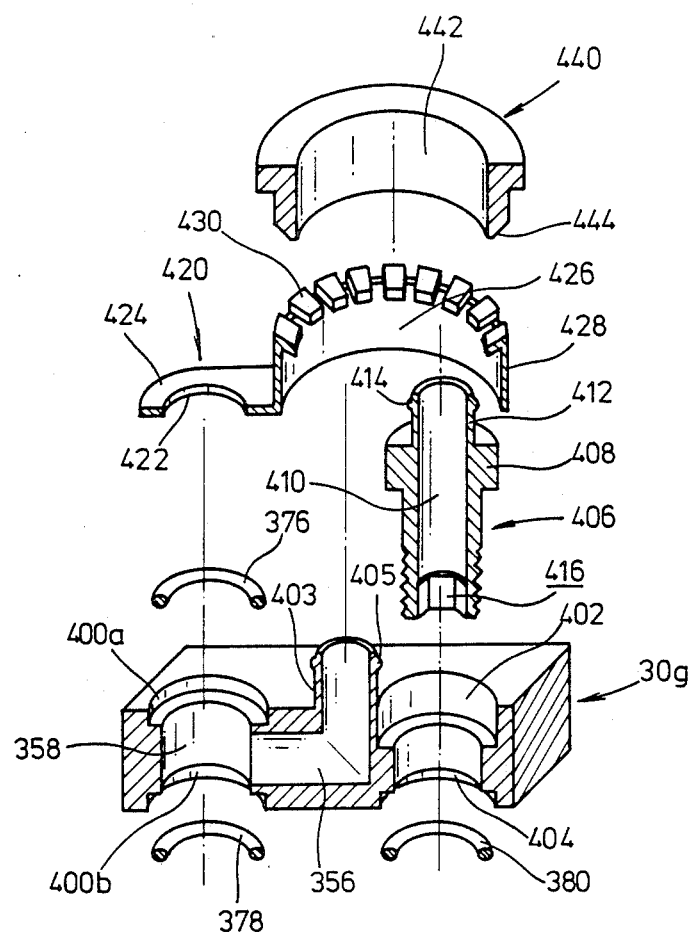
FIG. 18 is an exploded perspective view illustrating the correlationship between the multi-passage tube, the connecting mechanism, and the fluid-pressure-operated device shown in FIG. 17.

According to a still further embodiment shown in FIGS. 17 and 18, one of two coupling members in the preceding embodiment is separate from the body, and a chuck member and a release bushing are employed for coupling the multi-passage tube 370.

A body 30g is in the form of a rectangular parallelepiped and has a fluid passage 356 extending in a bent pattern from a central portion of the body 30g. The fluid passage 356 is held in communication with a larger-diameter hole 356 defined vertically through the body 30g. Annular grooves 400a, 400b are defined at upper and lower ends, respectively, of the hole 358. Seal rings 376, 378 are fitted respectively in the annular grooves 400a, 400b.

A stepped hole 402 is defined vertically in the body 30g at a side opposite to the hole 358. An annular groove 404 is defined at a lower end of the stepped hole 402, and a seal ring 380 is fitted in the annular groove 404.

A coupling member 403 projects upwardly from the body 30g and has a passage extending upwardly from the fluid passage 356 in communication therewith. The coupling member 403 has an annular ridge 405 disposed on the outer circumferential surface thereof near its upper end and having a sharp edge.

A tubular fastening member 406 has an intermediate flange 408 on its outer circumferential surface and a fluid passage 410 defined axially therethrough. An annular ridge 414 having a sharp edge is disposed on the outer circumferential surface of a tube 412 projecting upwardly from the flange 408. The fastening member 406 has a lower end in which there is defined a hexagonal hole 416 extending axially to a prescribed length.

A chuck member 420 comprises a flat smaller-diameter portion 424 having a smaller-diameter hole 422 and a tubular larger-diameter portion 428 extending perpendicularly upwardly from the smaller-diameter portion 424 and having a larger-diameter hole 426. A plurality of circumferentially spaced teeth 430 are disposed on the upper edge of the larger-diameter portion 428 and directed inwardly and downwardly. A release bushing 440 is disposed on and above the chuck member 420. The release bushing 440 has a hole 442 sized for registry with the hole 426 of the chuck member 420, and an inclined surface 444 on an outer circumferential surface at its lower end. The holes 426, 442 are of substantially the same diameter as the outside diameter of the multi-passage tube 370.

For assembling the multi-passage tube coupling as shown in FIG. 17, the seal rings 376, 378 are fitted respectively in the annular grooves 400a, 400b of the body 30g, and the seal ring 380 is fitted in the annular groove 404. The body 30g is placed on the solenoid-operated valve manifold 272 with the hole 358 and the stepped hole 402 communicating with the fluid passages 276, 274, respectively. The fastening member 406 is threaded through the stepped hole 402 into the fluid passage 274. That is, the threads of the fastening member 406 are brought into threaded engagement with the threads in the passage 274 of the solenoid-operated valve manifold 272. The fastening member 406 may be turned by a hexagonal wrench engaging in the hexagonal hole 416 to cause the threads of the fastening member 406 to engage the threads in the passage 274. As a result, one end of the body 30g is tightly secured to the solenoid-operated valve manifold 272 by the flange 408 of the fastening member 406. Thereafter, the fastening member 362 is threadedly fitted through the hole 422 of the chuck member 420 and the hole 358 of the body 30g into the fluid passage 276.

More specifically, when the head of the fastening member 362 is turned, the external threads 364 of the fastening member 362 are brought into threaded engagement with the internal threads in the passage 276 of the solenoid-operated valve manifold 272. The other end of the body 30g and the chuck member 420 are thus firmly fixed to the solenoid-operated valve manifold 272. The fluid passage 360 of the fastening member 362 is now held in communication with the fluid passage 356 of the body 30g. Finally, the multi-passage tube 370 is fitted over the coupling member 403 and the tube 412 to connect the fluid passages 372, 374 respectively to the passages 356, 410. The multi-passage tube 370 is inserted, beforehand, through the hole 442 in the release bushing 440.

As the multi-passage tube 370 is inserted through the chuck member 420, the multi-passage tube 370 displaces the teeth 430 of the chuck member 420 radially outwardly while at the same time the fluid passages 372, 374 are fitted respective over the coupling member 403 and the tube 412. The annular ridges 405, 414 on the coupling member 403 and the tube 412 engaging in the fluid passages 372, 374 elastically displace the walls of the fluid passages 372, 374 radially outwardly When the multi-passage tube 370 is subjected to a force tending to pull it out, the outer circumferential surface thereof which is displaced to bulge radially outwardly by the annular ridges 405, 414 are brought into engagement with the teeth 430 of the chuck member 420. Therefore, the multi-passage tube 370 is prevented from being detached from the body 30g.

For removing the multi-passage tube 370 from the body 30g, the release bushing 440 is forcibly pushed downwardly in FIG. 17. The inclined surface 444 of the release bushing 440 is pressed against the teeth 430 to cause them to flex downwardly and radially outwardly out of engagement with the radially outwardly bulging surface of the multi-passage tube 370. The multi-passage tube 370 can then be pulled out simply by lifting the same upwardly.

With the arrangement of the present invention, as described above, a multi-passage tube having a plurality of fluid passages defined therein can easily and reliably be coupled in a small space to a fluid-pressure-operated device such as a solenoid-operated valve or a fluid cylinder in an air-tight manner. Therefore, a complex process of bundling tubes for introducing and discharging a fluid under pressure is not required, and hence the possibility of an erronenous tube connection is avoided. The multi-passage tube coupling of the present invention can easily be handled since it is highly reliable in preventing detachment of a coupled multi-passage tube and capable of easily connecting a multi-passage tube to a fluid-pressure-operated device.

Although certain preferred embodiments have been shown and described, it should be understood that many changes and modifications may be made therein without departing from the scope of the appended claims.

What is claimed is:

1. A coupling for a multi-passage tube having first and second fluid passages therein, comprising a body having first and second passages corresponding to the first and second fluid passages of the multi-passage tube, a recess formed in said body, a guide member seated in said recess, a radially flexible release bushing mounted on an outer annular surface of said tube and extending into said recess, said bushing being axially movable on said tube, a radially flexible chuck mounted on an outer annular surface of said bushing and having a portion engaged with said outer annular surface of said tube, a radially flexible collet mounted on an outer annular surface of said chuck, said coupling having a cylindrical portion connected within and extending from said first passage of said tube, said cylindrical portion defining a third passage therein aligned with said first passage of said tube for providing communication between the first passage of the tube and the first passage of the body, said cylindrical portion having an outer surface, and said coupling member defining a fourth passage between said cylindrical portion outer surface and said body, said fourth passage communicating between said second passage of the tube and said second passage of the body, whereby in response to axial movement of said release bushing on said tube, said bushing urges said chuck and collet radially outwardly for releasing said tube.

2. The coupling according to claim 1, wherein said portion of said chuck engaged with said outer annular surface of said tube being a sharp annular ridge.

3. The coupling according to claim 2 wherein said release bushing, said chuck and said collet have axially extending slits formed therein.

* * * * *